(12) United States Patent
Riguer et al.

(10) Patent No.: US 11,106,039 B2
(45) Date of Patent: Aug. 31, 2021

(54) SINGLE-STREAM FOVEAL DISPLAY TRANSPORT

(71) Applicant: ATI Technologies ULC, Markham (CA)

(72) Inventors: Guennadi Riguer, Thornhill (CA); Syed Athar Hussain, Scarborough (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/551,069

(22) Filed: Aug. 26, 2019

(65) Prior Publication Data

US 2021/0063741 A1    Mar. 4, 2021

(51) Int. Cl.
*G02B 27/01*   (2006.01)
*G06F 3/01*    (2006.01)
*G06F 1/16*    (2006.01)
*G06F 3/147*   (2006.01)

(52) U.S. Cl.
CPC ......... *G02B 27/0172* (2013.01); *G06F 1/163* (2013.01); *G06F 3/013* (2013.01); *G06F 3/147* (2013.01); *G02B 2027/014* (2013.01); *G02B 2027/0134* (2013.01); *G02B 2027/0178* (2013.01)

(58) Field of Classification Search
CPC ..... G02B 27/0172; G06F 1/163; G06F 3/013; G06F 3/147
USPC .......... 345/3.2, 8; 348/62; 375/219; 382/132
See application file for complete search history.

(56) References Cited

U.S. PATENT DOCUMENTS

| | | | |
|---|---|---|---|
| 6,809,716 B1 * | 10/2004 | Kim | G09G 5/005 345/3.2 |
| 10,659,722 B2 * | 5/2020 | Takagi | H04N 7/0102 |
| 2005/0047504 A1 | 3/2005 | Sung et al. | |
| 2009/0202177 A1 | 8/2009 | Jeffrey | |

(Continued)

OTHER PUBLICATIONS

"Co-occurrence matrix", Wikipedia.org, Sep. 7, 2016, 2 pages, https://en.wikipedia.org/wiki/Co-occurrence_matrix. [Retrieved Jul. 31, 2018].

(Continued)

*Primary Examiner* — Prabodh M Dharia
(74) *Attorney, Agent, or Firm* — Rory D. Rankin; Kowert, Hood, Munyon, Rankin & Goetzel, P.C

(57) ABSTRACT

Systems, apparatuses, and methods for implementing a single-stream foveal display transport are disclosed. A system includes a transmitter sending an image over a display transport as a sequence of equi-sized rectangles to a receiver coupled to a display. The receiver then scales up the rectangles with different scale factors to cover display areas of different sizes. The pixel density within a rectangular region is uniform and scaling factors can take on integer or non-integer values. The rectilinear grid arrangement of the image results in simplified scaling operations for the display. In another scenario, the image is transmitted as a set of horizontal bands of equal size. Within each band, the same horizontal amount of transmitted pixels are redistributed across multiple rectangular regions of varied scales. The display stream includes embedded information and the horizontal and/or vertical distribution and scaling of rectangular regions, which can be adjusted for each transmitted image.

20 Claims, 6 Drawing Sheets

(56) References Cited

U.S. PATENT DOCUMENTS

| | | | |
|---|---|---|---|
| 2009/0268791 A1* | 10/2009 | Waheed | H03L 7/099 |
| | | | 375/219 |
| 2010/0172567 A1* | 7/2010 | Prokoski | A61B 5/415 |
| | | | 382/132 |
| 2013/0129245 A1 | 5/2013 | Tin | |
| 2014/0269919 A1 | 9/2014 | Rodriguez | |
| 2014/0376624 A1 | 12/2014 | Li et al. | |
| 2015/0055706 A1 | 2/2015 | Xu et al. | |
| 2015/0256850 A1 | 9/2015 | Kottke et al. | |
| 2015/0277123 A1* | 10/2015 | Chaum | G02B 27/0075 |
| | | | 348/62 |
| 2017/0295373 A1 | 10/2017 | Zhang | |
| 2017/0302918 A1 | 10/2017 | Mammou et al. | |
| 2018/0109804 A1 | 4/2018 | Saeedi | |
| 2018/0124404 A1 | 5/2018 | Pomianowski et al. | |
| 2018/0136720 A1* | 5/2018 | Spitzer | G09G 5/391 |
| 2018/0176535 A1 | 6/2018 | Ninan et al. | |
| 2018/0190236 A1 | 7/2018 | Philipp | |
| 2018/0255315 A1 | 9/2018 | Edpalm | |
| 2018/0262758 A1 | 9/2018 | El-Ghoroury et al. | |
| 2018/0298157 A1* | 10/2018 | Khe | C09D 11/52 |
| 2018/0352255 A1* | 12/2018 | Hinds | G06T 9/00 |
| 2018/0357809 A1* | 12/2018 | Lawless | G06T 1/20 |
| 2019/0045210 A1 | 2/2019 | Guermazi et al. | |
| 2019/0110198 A1 | 4/2019 | Lecun et al. | |
| 2020/0195944 A1 | 6/2020 | Di Cera et al. | |
| 2020/0327863 A1* | 10/2020 | Grossman | H04N 7/0117 |

OTHER PUBLICATIONS

International Search Report and Written Opinion in International Application No. PCT/IB2019/057945, dated Dec. 9, 2019, 8 pages.

International Search Report and Written Opinion in International Application No. PCT/US2019/066295, dated Mar. 4, 2020, 11 pages.

Ella et al., "Dual Mode MIPI C-PHYSM/D-PHYSM Use in VR Display IC", MIPI Alliance Developers Conference, Oct. 19, 2018, 24 pages, https://www.mipi.org/sites/default/files/2018-MIPI-DevCon-Ella-Lukanc-Mixel-Synaptics-Dual-Mode-C-PHY-D-PHY.pdf. [Retrieved Nov. 25, 2020].

International Search Report and Written Opinion in International Application No. PCT/IB2020/057981, dated Nov. 10, 2020, 9 pages.

* cited by examiner

SINGLE-STREAM FOVEAL DISPLAY TRANSPORT

BACKGROUND

Description of the Related Art

As resolutions and refresh rates of displays increase, the required transmission bandwidth of the displayed image becomes a major limiting factor. For virtual reality (VR) and augmented reality (AR) headsets or head mounted displays (HMDs), this becomes an even bigger problem as the physical thickness of the cable is a concern since it hinders user mobility, and adding more wires to transmit higher resolution images is an unacceptable solution. In order to create an immersive environment for the user, VR and AR solutions typically have high resolution and high frame-rates, which equates to high data-rates. In the case of VR and AR displays, particularly with eye tracking, it is wasteful to transmit the full resolution image as is commonly done today.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a single-stream foveal display transport are disclosed herein. In one implementation, a system includes a transmitter sending an image as a sequence of equi-sized rectangles over a display transport to a receiver. The receiver then scales the rectangles back to their original sizes using appropriate scaling factors. The result is a plurality of variable-sized rectangles which the receiver then drives to a display. The pixel density within a rectangular region is uniform and scaling factors can take on integer or non-integer values. The rectilinear grid arrangement of the image results in simplified scaling operations for the receiver. In another scenario, rather than transmitting the image as a sequence of equi-sized rectangles, the image is transmitted as a set of horizontal bands of equal size. Within each band, the receiver either scales up or scales down the pixels to match the size of the band in the original image. Further, each of the horizontal bands can be individually subdivided into a single row of equi-sized rectangles in the transmitted image that can be expanded into scaled rectangles to match the regions of the original image. The display stream includes embedded information about the horizontal and/or vertical distribution and scaling of rectangular regions, which can be adjusted for each transmitted image.

Figure 1:
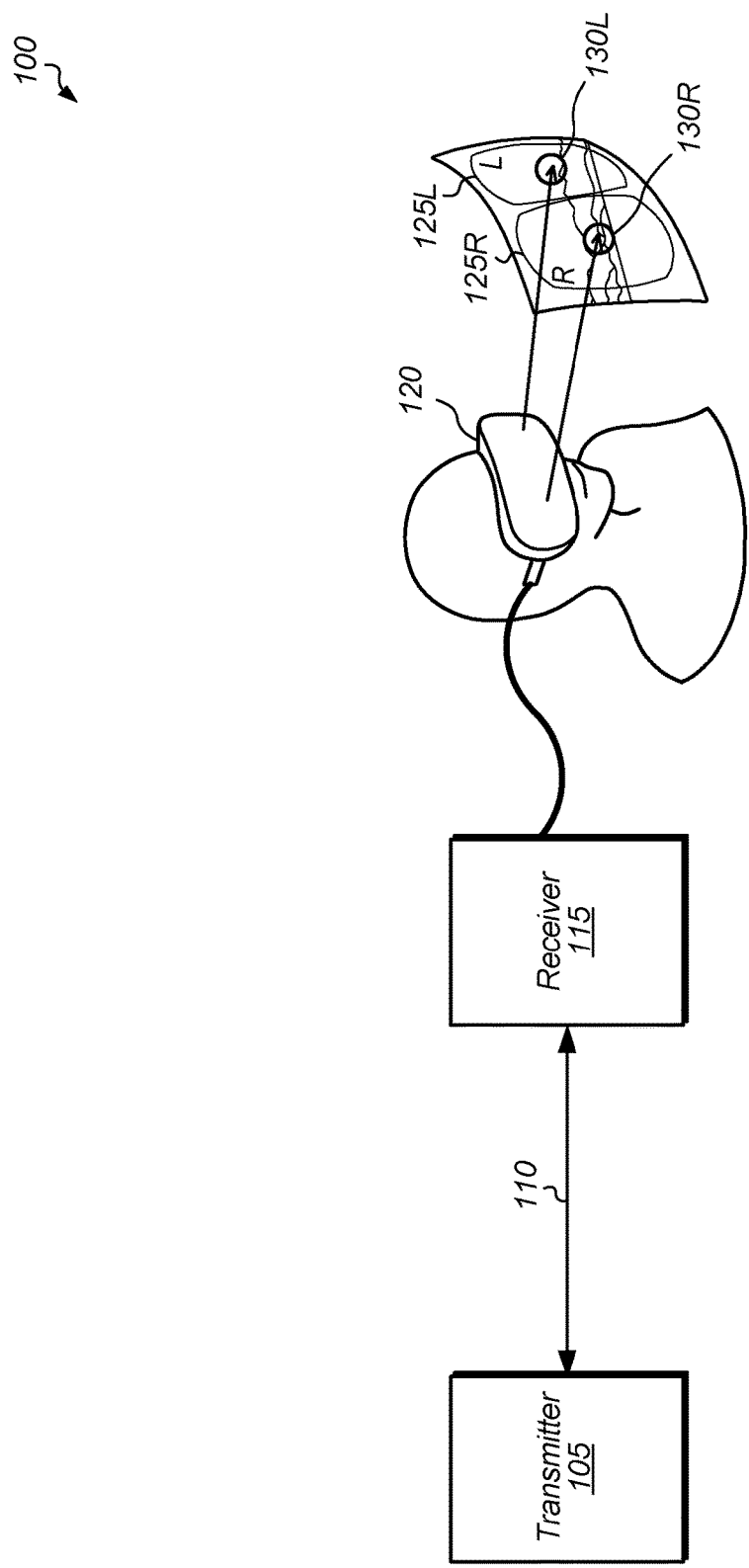
FIG. 1 is a block diagram of one implementation of a system.

Referring now to FIG. 1, a block diagram of one implementation of a system 100 is shown. In one implementation, system 100 includes transmitter 105, channel 110, receiver 115, and head-mounted display (HMD) 120. It is noted that transmitter 105 and receiver 115 can also be referred to as transceivers or as communication devices. In one implementation, HMD 120 includes right eye display 125R and left eye display 125L. Within right display 125R is foveal region 130R, which is the area of right display 125R at which the right eye of the user is focusing. Similarly, inside left display 125L is foveal region 130L, which is the portion of left display 125L at which the left eye of the user is pointing. As used herein, the term "foveal region" is defined as the portion of a per-eye displayed half frame where each eye is focusing. In some cases, the "foveal region" is determined based at least in part on an eye-tracking sensor detecting the location within the half frame where the eye is pointing. Additionally, the term "foveal region" can also be referred to as a "focus region". It is noted that in other implementations, system 100 can include other components and/or system 100 can include more than one component of those shown in FIG. 1. For example, in another implementation, system 100 includes multiple receivers with multiple HMDs.

In one implementation, channel 110 is a wired connection between transmitter 105 and receiver 115. For example, in one implementation, channel 110 is a direct wired connection between a transmitter 105 and a receiver 115. In another implementation, channel 110 is representative of a network connection between transmitter 105 and receiver 115. Any type and number of networks can be employed depending on the implementation to provide the connection between transmitter 105 and receiver 115. For example, transmitter 105 is part of a cloud-service provider in one particular implementation. In another implementation, channel 110 represents a wireless connection between transmitter 105 and receiver 115.

In one implementation, transmitter 105 receives a video sequence to be encoded and sent to receiver 115. In another implementation, transmitter 105 includes a rendering unit which is rendering the video sequence to be encoded and transmitted to receiver 115. In order to simplify the scaling of video frames at receiver 115, a single-stream foveated display sequence is transmitted (e.g., via a transport layer) between the transmitter 105 and receiver 115. Each frame of the display sequence is scaled to create equi-sized regions which are transmitted. When receiver 115 receives each frame, receiver 115 scales the equi-sized regions using different scaling factors to create a scaled frame with variable-sized regions. This scaled frame is then driven to HMD 120. In one implementation, the display stream that is transmitted contains embedded information about the horizontal and vertical scaling of rectangular regions, and this information can be adjusted for each transmitted frame. In one implementation, receiver 115 is separate from HMD 120, and receiver 115 communicates with HMD 120 using a wired or wireless connection. In another implementation, receiver 115 is integrated within HMD 120.

Transmitter 105 and receiver 115 are representative of any type of communication devices and/or computing devices. For example, in various implementations, transmitter 105 and/or receiver 115 can be a mobile phone, tablet, computer, server, HMD, television, another type of display, router, or other types of computing or communication devices. In one implementation, system 100 executes a virtual reality (VR) application for wirelessly transmitting frames of a rendered virtual environment from transmitter 105 to receiver 115. In other implementations, other types of applications (e.g., augmented reality (AR) applications) can be implemented by system 100 that take advantage of the methods and mechanisms described herein.

Within each image that is displayed on HMD 120, the scene being displayed on the right side 125R of HMD 120 includes a focus region 130R while the scene being displayed on the left side 125L of HMD 120 includes a focus region 130L. These focus regions 130R and 130L are indicated by the circles within the expanded right side 125R and left side 125L, respectively, of HMD 120. In one implementation, the locations of focus regions 130R and 130L within the right and left half frames, respectively, are determined based on eye-tracking sensors within HMD 120. In this implementation, the eye tracking data is provided as feedback to transmitter 105 and optionally to the rendering source of the VR video. In some cases, the eye tracking data feedback is generated at a frequency higher than the VR video frame rate, and transmitter 105 is able to access the feedback and update the encoded video stream on a per-frame basis. In some cases, the eye tracking is not performed on HMD 120, but rather, the video and other sensor data is sent back to the transmitter 105 for further processing to determine the eye's position and movement. In another implementation, the locations of focus regions 130R and 130L are specified by the VR application based on where the user is expected to be looking. In another implementation, the locations of focus regions 130R and 130L are determined based on the characteristics of the optical system alone or in combination with eye tracking. It is noted that the size of focus regions 130R and 130L can vary according to the implementation. Also, the shape of focus regions 130R and 130L can vary according to the implementation, with focus regions 130R and 130L defined as ellipses in another implementation. Other types of shapes can also be utilized for focus regions 130R and 130L in other implementations.

Figure 2:
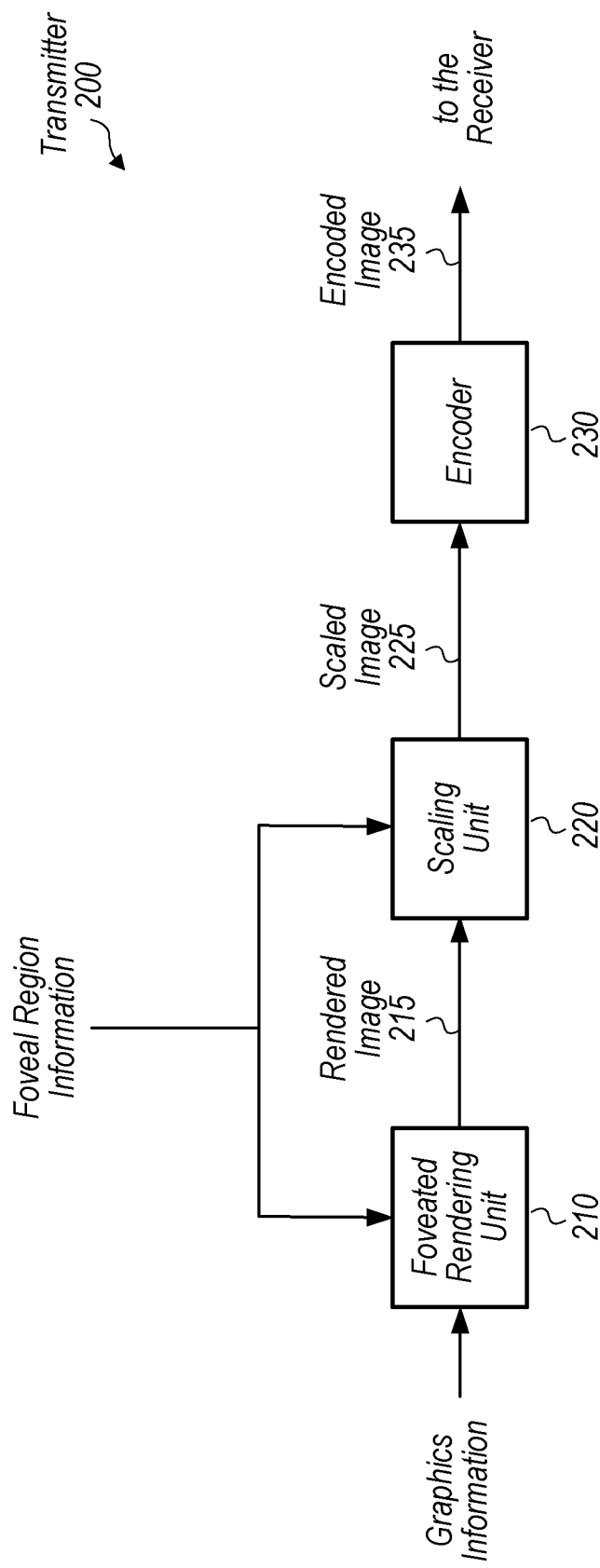
FIG. 2 is a block diagram of one implementation of a transmitter.

Turning now to FIG. 2, a block diagram of one implementation of a transmitter 200 is shown. In one implementation, transmitter 200 includes at least foveated rendering unit 210, scaling unit 220, and encoder 230. Alternatively, in another implementation, foveated rendering unit 210 is coupled to transmitter 200 rather than being integrated within transmitter 200. It is noted that transmitter 200 can also include other components which are not shown to avoid obscuring the figure. While foveated rendering unit 210, scaling unit 220, and encoder 230 are shown as separate units in FIG. 2, it is noted that in other implementations, any two of these units can be combined together into a single unit or all three units can be combined together into a single unit. It is also noted that in other implementations, any of foveated rendering unit 210, scaling unit 220, and encoder 230 can be split up into multiple separate units to perform different functions associated with a corresponding unit. Each of rendering unit 210, scaling unit 220, and encoder 230 is implemented using any suitable combination of hardware (e.g., control logic, processing unit) and/or software (e.g., program instructions executable by a processor).

In one implementation, foveated rendering unit 210 generates rendered image 215 from graphics information (e.g., raw image data). In one implementation, rendered image 215 is a single video frame of a video sequence. It is noted that the terms "image", "frame", and "video frame" can be used interchangeably herein. Foveated rendering unit 210 receives foveal region information which specifies the foveal region(s) (e.g., foveal regions 130R and 130L of FIG. 1) within the frame. In one implementation, the foveal region information is provided to transmitter 200 from one or more eye-tracking sensors in the HMD (e.g., HMD 120 of FIG. 1). Foveated rendering unit 210 uses the foveal region information to generate the foveal region at a relatively higher pixel density than the other regions of rendered image 215.

In one implementation, rendered image 215 is partitioned into a plurality of variable-sized regions (i.e., non-equi-sized regions). In one implementation, each region of the plurality of regions is a rectangle. In another implementation, the plurality of regions are horizontal bands, which can be further subdivided into rectangles. In other implementations, the regions can have other types of shapes. The plurality of regions include a single foveal region and a plurality of non-foveal regions. In one implementation, the foveal region is a relatively smaller region than the non-foveal regions. In one implementation, the region scaling is matched to the acuity of the human visual system (HVS) and scaling within each region is driven by acuity. In other words, scaling increases as the distance from the foveal region increases.

Scaling unit 220 receives rendered image 215 as well as foveal region information. In one implementation, scaling unit 220 converts the variable-sized regions in rendered image 215 into equi-sized regions in scaled image 225 by using different scale factors to scale the different variable-sized regions in rendered image 215. For example, in one implementation, scaling unit 210 maintains the original pixel density of the foveal region of rendered image 215 while scaling down the non-foveal regions of rendered image 215. Scaling unit 210 uses different scaling factors on the non-foveal regions, with the scaling factor chosen based on the specific size of the non-foveal region. As a result of using the different scaling factors on the different regions, scaling unit 220 converts the variable-sized regions of rendered image 215 into the equi-sized regions of scaled image 225. It is noted that each of the equi-sized regions of scaled image 225 includes the same number of pixels. In one implementation, scaling unit 220 divides the size of the image by the number of regions to calculate the target size of each equi-sized region. Then, in this implementation, scaling unit 220 scales each region by an amount which will cause the size of the scaled region to the target size. For example, if the size of the image is 1000-by-1000 pixels and there are five horizontal and five vertical divisions of regions in the image, then the target size of each equi-sized region is 200-by-200 pixels. In other implementations, the target size of each equi-sized region can be calculated in a similar manner for other sizes of images and/or other numbers of regions.

If the original size of the given region is greater than the target size, then the given region will be downscaled (i.e., downsampled), which will cause each pixel value to be combined with one or more neighboring pixel values to produce a pixel value in the scaled version of the given region. If the original size of the given region is less than the target size, then the given region will be upscaled (i.e., expanded), which will cause each pixel value to be used in calculating the values of two or more pixels in the scaled version of the given region.

After scaling unit 220 generates scaled image 225, the equi-sized regions of scaled image 225 are provided to encoder 230 which encodes scaled image 225 into encoded image 235 to be transmitted to the receiver (not shown). In one implementation, encoded image 235 includes metadata identifying the size and location of the foveal region within encoded image 235. Encoded image 235 also includes metadata specifying the scaling factors which should be used for converting the equi-sized regions of encoded image 235 back to the original variable-sized regions to recreate a non-distorted version of the original image.

It is noted that in one implementation, each image shown in FIG. 2 is actually representative of a pair of images with one image for each eye view of the HMD. For example, in this implementation, rendered image 215 is representative of a pair of images that include a first rendered image for the right eye and a second rendered image for the left eye. Similarly, scaled image 225 is representative of a pair of images for the right and left eye portions of the HMD, and encoded image 235 is representative of a pair of images for the right and left eye portions. Alternatively, each image generated by the circuitry in FIG. 2 includes left-eye and right-eye portions which are combined together into a single image.

Figure 3:
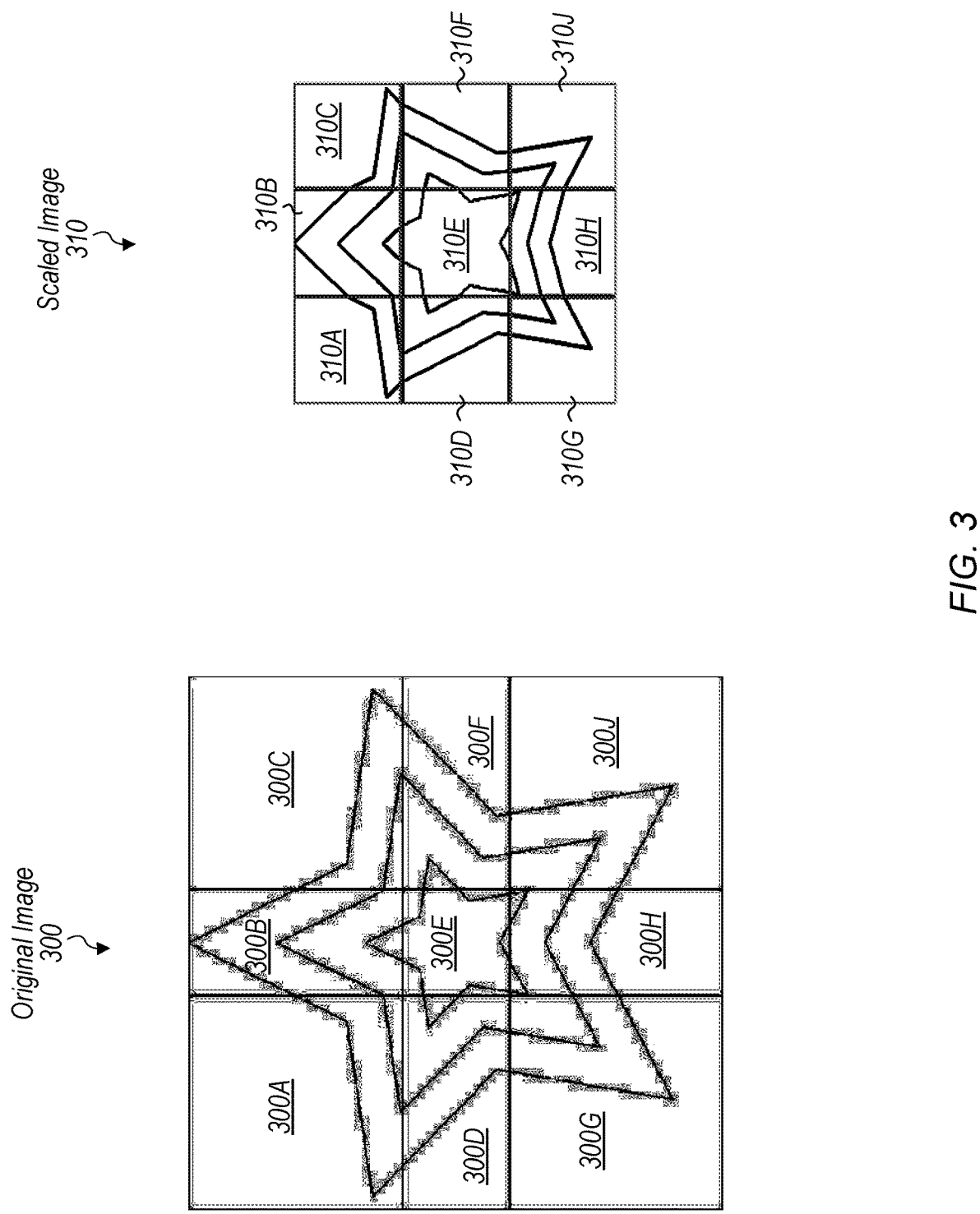
FIG. 3 illustrates examples of an original, pre-scaled image and a scaled image in accordance with one implementation.

Referring now to FIG. 3, examples of an original, pre-scaled image and a scaled image in accordance with one implementation are shown. Original image 300, shown on the left-side of FIG. 3, is a two-dimensional array of pixel values that represents a frame of a video. Original image 300 is representative of rendered image 215 of FIG. 2. It is assumed for the purposes of this discussion that the center rectangular region 300E corresponds to the foveal region (i.e., high-acuity region) as it maps to the original image 300. In one implementation, the pixel density within each rectangular region of original image 300 is uniform. Accordingly, in this implementation, the partitioning of original image 300 into regions 300A-J is based on each region having uniform pixel density within that region.

Scaled image 310 is shown on the right-side of FIG. 3 which is a scaled version of original image 300 after scaling factors have been applied to the variable-sized regions 300A-J to create equi-sized regions 310A-J. While scaled image 310 distorts the content of original image 300, this distortion will be removed by the receiver prior to a resultant, undistorted image being driven to a display. It is noted that scaled image 310 is representative of one example of scaled image 225 (of FIG. 2) in accordance with one implementation. It is also noted that scaling factors can take on integer or non-integer values. In one implementation, scaled region 310 is generated by a scaling unit (e.g., scaling unit 220 of FIG. 2) applying different scaling factors which vary based on a size of the region within original image 300. As shown in FIG. 3, region 300E of original image 300 is kept at scale, leaving region 310E of scaled image 300 unchanged from region 300E. The other regions 300A-D and 300F-J are either left at scale or are downscaled by different amounts which are proportional to their sizes to create regions 310A-D and 310F-J, respectively.

When a transmitter encodes scaled image 310 and then sends the encoded result to a receiver, the receiver decodes the encoded image and then reverses the scaling process to revert the image back to a version which is linearly scaled with respect to original image 300. With this scheme, the scaling on the receiver side is relatively simple and can be implemented by buffering a small number of previous display rows even across regions of different scaling.

It should be understood that the partitioning of original image 300 and scaled image 310 into nine separate rectangular regions is for illustrative purposes. In real implementations, original image 300 and scaled image 310 can be partitioned into nine or other numbers of regions of uniform pixel density. Additionally, the shapes of the regions can also vary according to the implementation. For example, in another implementation, original image 300 and scaled image 310 are partitioned into horizontal bands, or horizontal bands further subdivided into rectangles.

Figure 4:
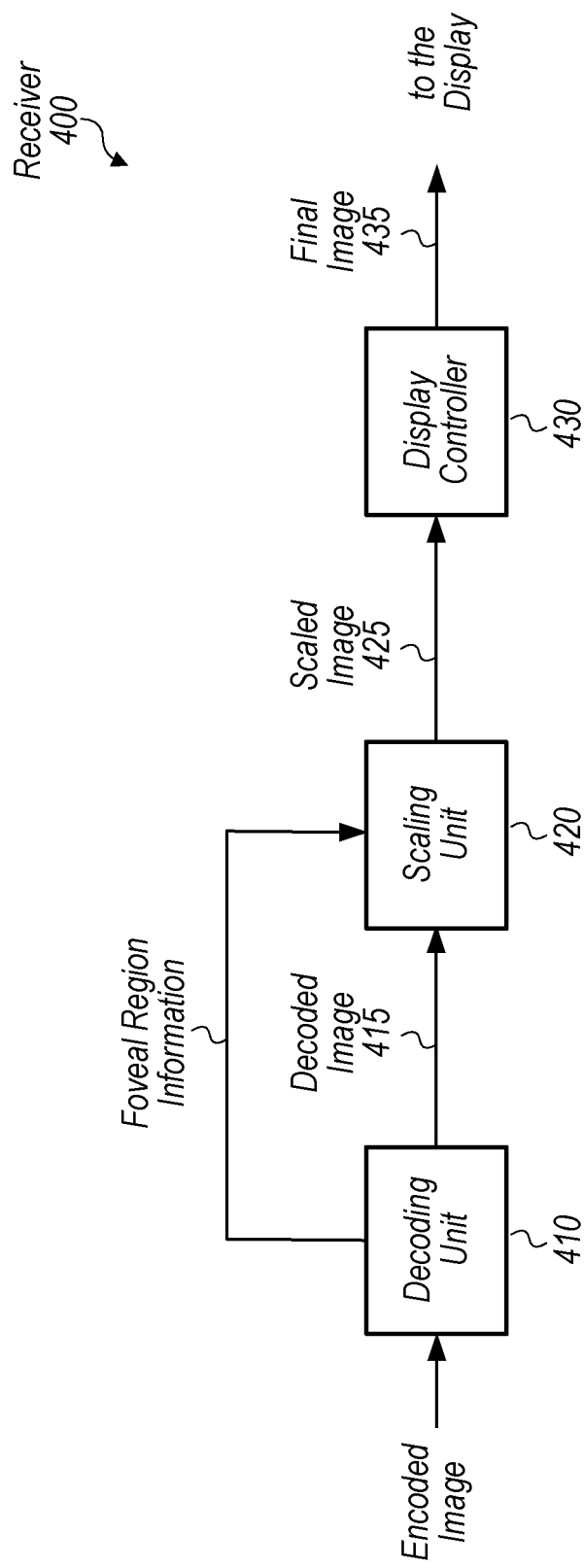
FIG. 4 is a block diagram of one implementation of a receiver.

Turning now to FIG. 4, a block diagram of one implementation of a receiver 400 is shown. In one implementation, receiver 400 is integrated within a HMD (e.g., HMD 120 of FIG. 1). In another implementation, receiver 400 is a separate component from the HMD, and receiver 400 communicates with the HMD over a wired or wireless interface. In one implementation, receiver 400 includes at least decoding unit 410, scaling unit 420, and display controller 430. It is noted that receiver 400 can include other units which are not shown to avoid obscuring the figure. In other implementations, receiver 400 can include other units and/or receiver 400 can be structured in other suitable arrangements. It is also noted that two or more of the units shown in FIG. 4 can be combined together into a single unit in other implementations.

In one implementation, decoding unit 410 receives the encoded image which was sent to receiver 400 by a transmitter (e.g., transmitter 105 of FIG. 1). Decoding unit 410 decodes the encoded image to produce decoded image 415 which is conveyed to scaling unit 420. It is noted that decoded image 415 includes a plurality of equi-sized regions. Decoding unit 410 also extracts the foveal region information and scaling factors from the metadata of the encoded image. Scaling unit 420 receives decoded image 415 and the foveal region information and scaling factors from decoding unit 410. The scaling factors can be specified in different manners depending on the implementation. In one implementation, there is a scaling factor specified per region or per horizontal row and vertical column of regions. In another implementation, the scaling factor is specified using a formula that adjusts the amount of scaling based on the horizontal and vertical displacement from the foveal region.

Scaling unit 420 generates scaled image 425 by performing the specified scaling on the equi-sized regions of decoded image 415. In one implementation, scaled image 425 includes a plurality of variable sized regions, where the foveal region is a relatively small region and the non-foveal regions are relatively larger regions. Display controller 430 processes scaled image 425 in a manner adapted to the particular target display so as to generate final image 435. Final image 435 is then driven to the target display (e.g., HMD) (not shown). It is noted that final image 435 can be stored in a frame buffer or other location prior to being driven to the target display.

Figure 5:
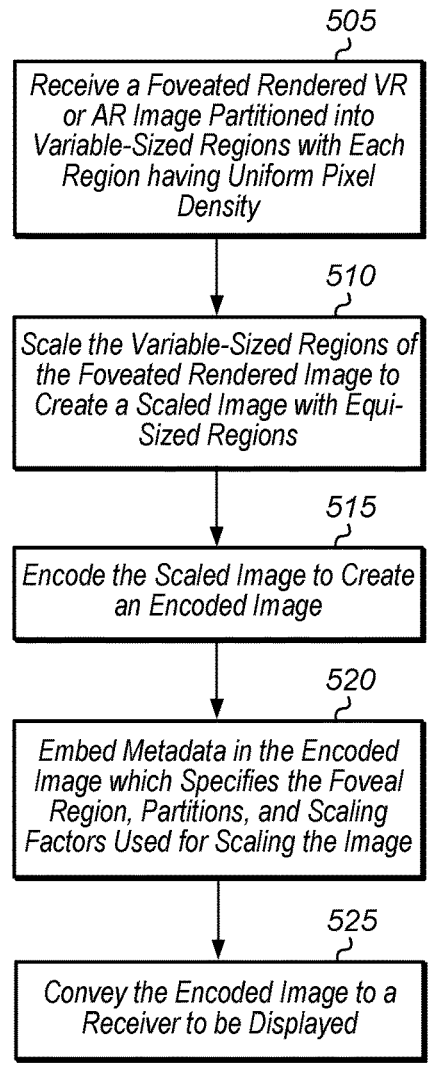
FIG. 5 is a generalized flow diagram illustrating one implementation of a method for transmitter generating a scaled image with equi-sized regions for transmission to a receiver.
Figure 6:
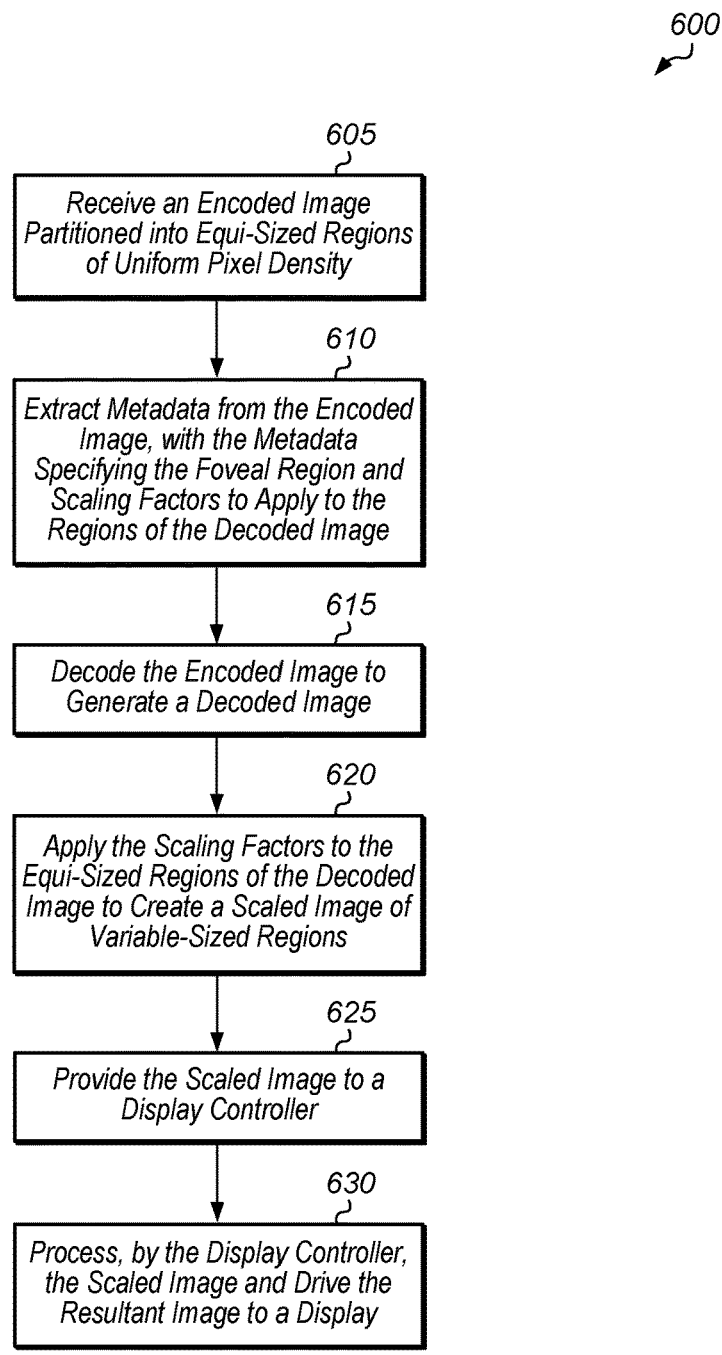
FIG. 6 is a generalized flow diagram illustrating one implementation of a method for receiving, decoding, and scaling an image to be displayed.

Referring now to FIG. 5, one implementation of a method 500 for a transmitter generating a scaled image with equi-sized regions for transmission to a receiver is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A transmitter receives a foveated rendered VR or AR image partitioned into variable-sized regions with each region having uniform pixel density (block 505). It is noted that the pixel density could vary from region to region. In one implementation, the variable-sized regions include a relatively smaller foveal region and relatively larger non-foveal regions. In another implementation, the transmitter includes a rendering unit which generates the foveated rendered VR or AR image. As used herein, the term "foveated rendered" is defined as a technique for rendering an image with a high-resolution region that corresponds to the portion of the image at which the user's gaze is directed while other regions are rendered at a lower resolution or lower fidelity. In some cases, a foveated rendered image has a variable amount of pixel resolution that varies according to a distance from the foveal region of the image, with the pixel resolution or fidelity reduced as a distance from the foveal region increases.

The transmitter scales the variable-sized regions of the foveated rendered image to create a scaled image with equi-sized regions (block 510). Then, the transmitter encodes the scaled image to create an encoded image (block 515). Any type of suitable encoding scheme can be used by the transmitter to encode the scaled image, with the type of encoding scheme varying depending on the implementation. Also, the transmitter embeds metadata in the encoded image which specifies the foveal region, partitions, and scaling factors used for scaling the image (block 520). In various implementations, the metadata specifies the size and location of the foveal region, number of partitions, shape of partitions, scaling factors which were used to scale the partitions, and so on. Alternatively, rather than embedding the metadata in the encoded image, the metadata is sent separately to the receiver. Next, the transmitter conveys the encoded image to a receiver to be displayed (block 525). After block 525, method 500 ends.

Turning now to FIG. 6, one implementation of a method 600 for receiving, decoding, and scaling an image to be displayed is shown. A receiver receives an encoded image partitioned into equi-sized regions of uniform pixel density (block 605). Next, the receiver extracts metadata from the encoded image, with the metadata specifying the foveal region and scaling factors to apply to the regions of the decoded image (block 610). Also, the receiver decodes the encoded image to generate a decoded image (block 615). The receiver can be any type of computing device or apparatus. In one implementation, the receiver includes or is coupled to a head-mounted display (HMD).

Then, the receiver applies the scaling factors to the equi-sized regions of the decoded image to create a scaled image of variable-sized regions (block 620). For example, in one implementation, the scaling factors include upscale factors to apply to the regions of the received image, with the region scale factors inversely proportional to the scales used by the transmitter when downscaling the original image regions. In one implementation, foveal region information is used to control the scaling methods, image sharpening and other image processing. The result of block 620 is a version of the image that is linearly scaled with respect to the original image. Next, the scaled image is provided to a display controller (block 625). Then, the display controller processes the scaled image and drives the resultant image to a display (block 630). After block 630, method 600 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A transmitter comprising:
   a scaling unit configured to:
      receive a foveated rendered image that is partitioned into a plurality of variable-sized regions, with each region having a uniform pixel density; and
      scale the plurality of variable-sized regions of the foveated rendered image to create a scaled image with equi-sized regions; and
   an encoder configured to encode the scaled image to create an encoded image.

2. The transmitter as recited in claim 1, wherein scaling the foveated rendered image comprises applying a scaling factor to each region of the plurality of variable-sized regions, wherein the scaling factor is calculated based on a size of a given region in relation to a target size of an equi-sized region.

3. The transmitter as recited in claim 1, wherein the plurality of variable-sized regions are rectangles within the foveated rendered image.

4. The transmitter as recited in claim 1, wherein the plurality of variable-sized regions are horizontal bands within the foveated rendered image.

5. The transmitter as recited in claim 4, wherein the plurality of variable-sized regions are subregions of horizontal bands within the foveated rendered image.

6. The transmitter as recited in claim 1, wherein the transmitter is configured to embed metadata in the encoded image which is conveyed to the receiver, wherein the metadata specifies a foveal region of the image and scaling factors to apply to regions of a decoded version of the image.

7. The transmitter as recited in claim 1, wherein the scaling unit is further configured to:

apply a first scaling factor to a first region of the plurality of variable-sized regions; and apply a second scaling factor to a second region of the plurality of variable-sized regions, wherein the second scaling factor is different from the first scaling factor.

8. A method comprising:

receiving, by a transmitter, a foveated rendered image that is partitioned into a plurality of variable-sized regions, with each region having a uniform pixel density;

scaling the plurality of variable-sized regions of the foveated rendered image to create a scaled image with equi-sized regions; and encoding the scaled image to create an encoded image.

9. The method as recited in claim 8, wherein scaling the foveated rendered image comprises applying a scaling factor to each region of the plurality of variable-sized regions, wherein the scaling factor is calculated based on a size of the region in relation to a target size of an equi-sized region.

10. The method as recited in claim 8, wherein the plurality of variable-sized regions are rectangles within the foveated rendered image.

11. The method as recited in claim 8, wherein the plurality of variable-sized regions are horizontal bands within the foveated rendered image.

12. The method as recited in claim 8, wherein the plurality of variable-sized regions are rectangles within horizontal bands of the foveated rendered image.

13. The method as recited in claim 8, further comprising embedding metadata in the encoded image which is conveyed to the receiver, wherein the metadata specifies a foveal region of the image and scaling factors to apply to regions of a decoded version of the image.

14. The method as recited in claim 8, further comprising:

applying a first scaling factor to a first region of the plurality of variable-sized regions; and applying a second scaling factor to a second region of the plurality of variable-sized regions, wherein the second scaling factor is different from the first scaling factor.

15. A system comprising:

a transmitter configured to:

receive a foveated rendered image that is partitioned into a plurality of variable-sized regions with each region having a uniform pixel density;

scale the plurality of variable-sized regions of the foveated rendered image to create a first scaled image with equi-sized regions;

encode the first scaled image to create an encoded image;

transmit the encoded image; and a receiver configured to:

receive the encoded image;

decode the encoded image to generate a decoded image;

scale a plurality of regions of the encoded image with different scale factors to create a second scaled image; and drive the second scaled image to a display.

16. The system as recited in claim 15, wherein the different scale factors cause one or more of the plurality of regions to scale to display areas of different size.

17. The system as recited in claim 15, wherein the plurality of variable-sized regions are rectangles within the reconstructed foveated rendered image.

18. The system as recited in claim 15, wherein the plurality of variable-sized regions are horizontal bands within the reconstructed foveated rendered image.

19. The system as recited in claim 15, wherein the plurality of variable-sized regions are rectangles within horizontal bands of the reconstructed foveated rendered image.

20. The system as recited in claim 15, wherein the transmitter is configured to embed metadata in the encoded image, wherein the metadata specifies a foveal region of the image and scaling factors to apply to regions of a decoded version of the image.

* * * * *